US008414769B2

(12) United States Patent
Servo et al.

(10) Patent No.: US 8,414,769 B2
(45) Date of Patent: Apr. 9, 2013

(54) DISC FILTER SECTOR AND DISC FILTER

(75) Inventors: Matti Servo, Tampere (FI); Irma Servo, Tampere (FI)

(73) Assignee: Metso Fabrics Inc., Tampere (FI)

( * ) Notice: Subject to any disclaimer, the term of this patent is extended or adjusted under 35 U.S.C. 154(b) by 0 days.

(21) Appl. No.: 12/518,785

(22) PCT Filed: Jan. 17, 2008

(86) PCT No.: PCT/FI2008/050014
§ 371 (c)(1),
(2), (4) Date: Jun. 11, 2009

(87) PCT Pub. No.: WO2008/087255
PCT Pub. Date: Jul. 24, 2008

(65) Prior Publication Data
US 2010/0032364 A1    Feb. 11, 2010

(30) Foreign Application Priority Data

Jan. 17, 2007  (FI) .................................. 20075026

(51) Int. Cl.
*B01D 33/00*     (2006.01)
*B01D 33/21*     (2006.01)
*B01D 33/23*     (2006.01)
*B01D 33/25*     (2006.01)
*B01D 29/00*     (2006.01)
*B01D 35/00*     (2006.01)

(52) U.S. Cl. ........ 210/331; 210/330; 210/345; 210/406; 210/486; 210/498

(58) Field of Classification Search .................. 210/331, 210/345, 486
See application file for complete search history.

(56) References Cited

U.S. PATENT DOCUMENTS

| 3,948,779 | A |   | 4/1976  | Jackson |
|-----------|---|---|---------|---------|
| 4,139,472 | A | * | 2/1979  | Simonson ....................... 210/232 |
| 4,162,982 | A | * | 7/1979  | Chesner ........................ 210/486 |
| 4,655,920 | A |   | 4/1987  | Ragnegard |
| 5,618,422 | A | * | 4/1997  | Pelkio .......................... 210/323.1 |
| 2002/0153296 | A1 |   | 10/2002 | Servo et al. |
| 2004/0144714 | A1 | * | 7/2004  | Varis et al. ..................... 210/486 |

FOREIGN PATENT DOCUMENTS

| EA | 004976 B1 | 10/2004 |
| FI | 92289 C   | 7/1994 |
| GB | 894318    | 4/1962 |
| SE | 521 492 C2 | 11/2003 |
| SE | 527 146 C2 | 1/2006 |
| SU | 406012    | 4/1974 |

OTHER PUBLICATIONS

Office Action issued in Russian Patent Application No. 2009127388; mailed Oct. 4, 2011.

* cited by examiner

*Primary Examiner* — Benjamin Kurtz
(74) *Attorney, Agent, or Firm* — Oliff & Berridge, PLC

(57) ABSTRACT

A disc filter includes several triangular sectors that are connected from their neck section to the body of the disc filter. The sectors form a relatively thin disc that is rotated during filtration in a basin that contains a suspension to be filtered. The side surfaces of the sector have openings through which liquid in the suspension passes into several essentially radial flow channels inside the sector to flow on to the neck section and away from the sector. A separating wall is formed between two adjacent radial flow channels. Furthermore, the sector is made of two side elements, which are of plastic material and the mating surfaces of which are placed against each other.

1 Claim, 5 Drawing Sheets

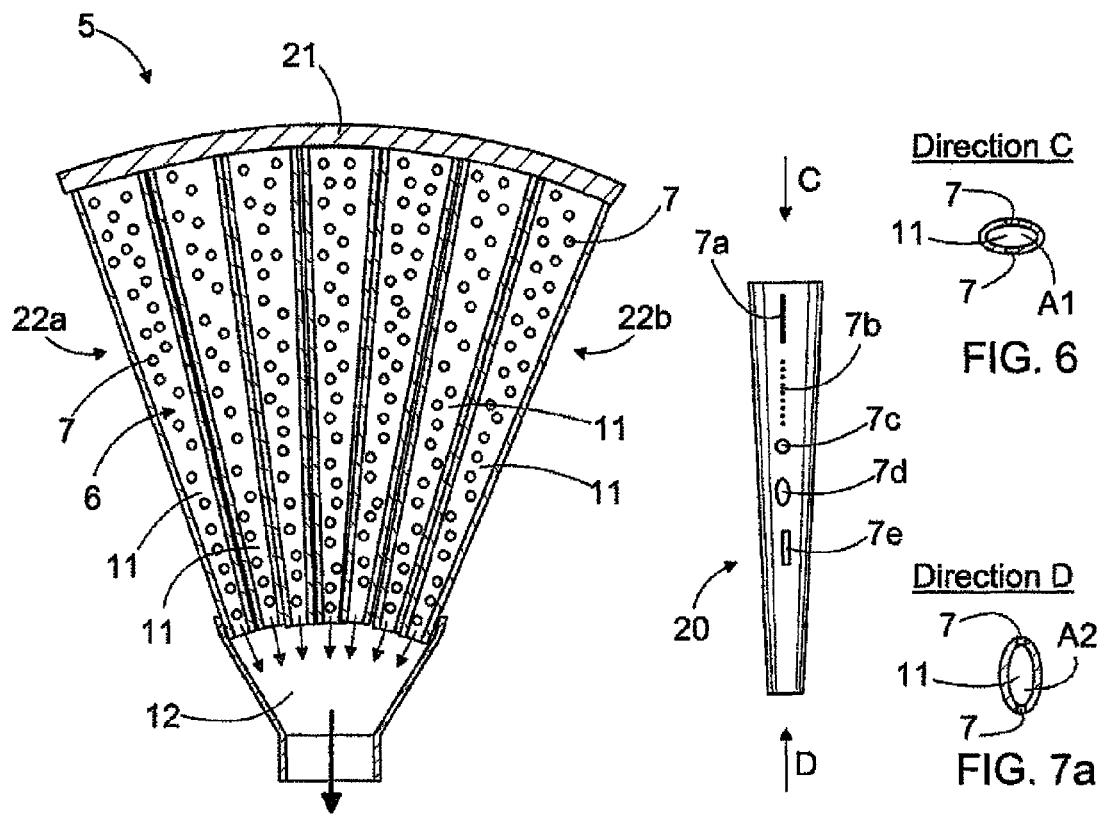
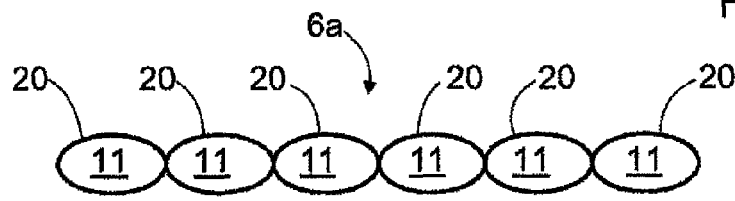
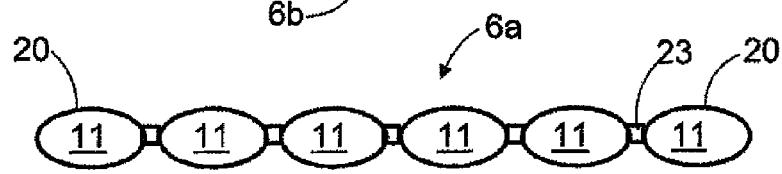
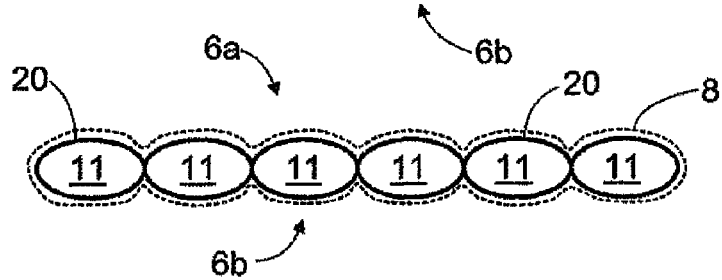

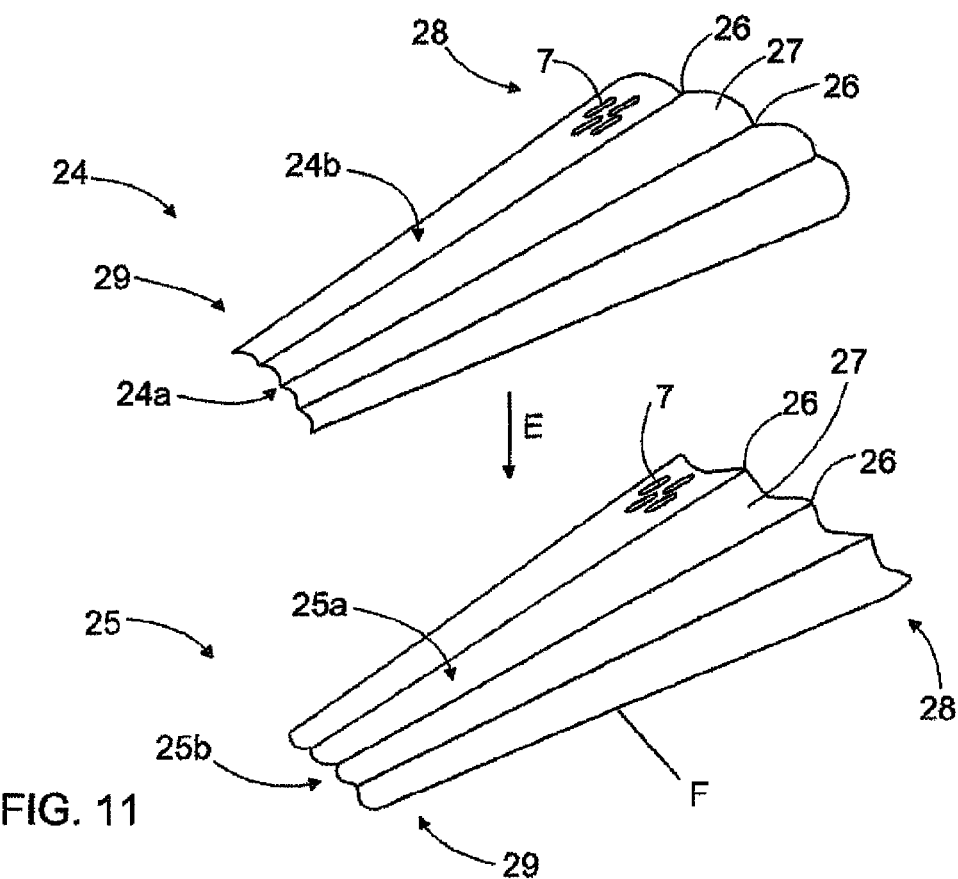
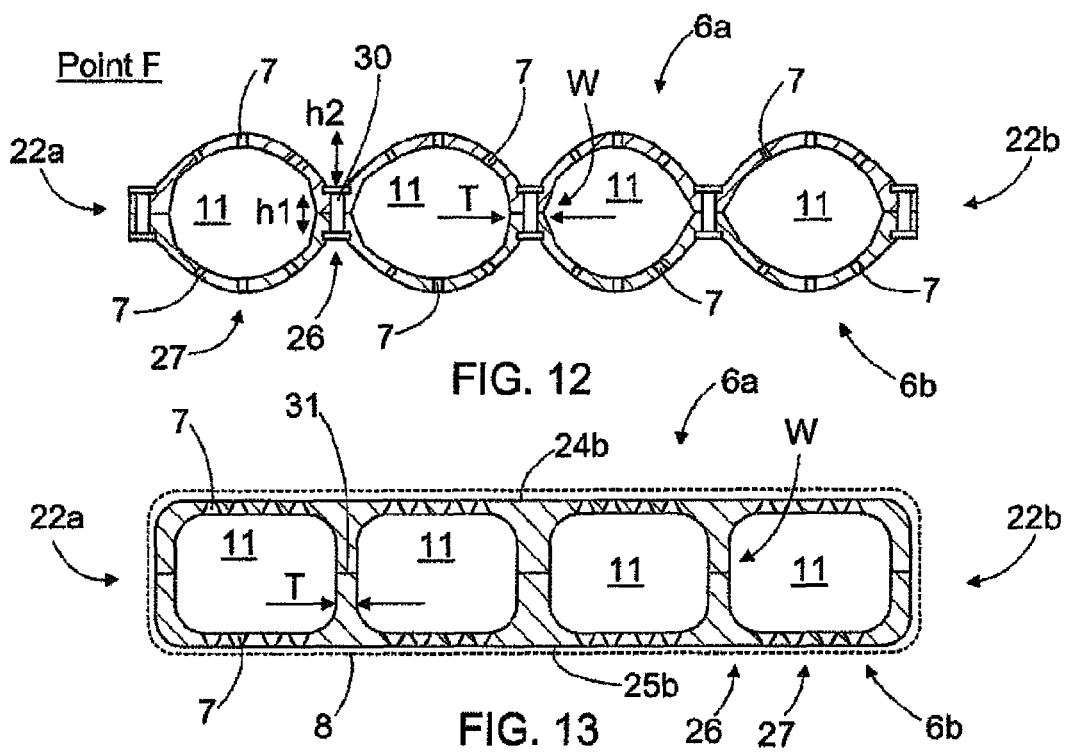

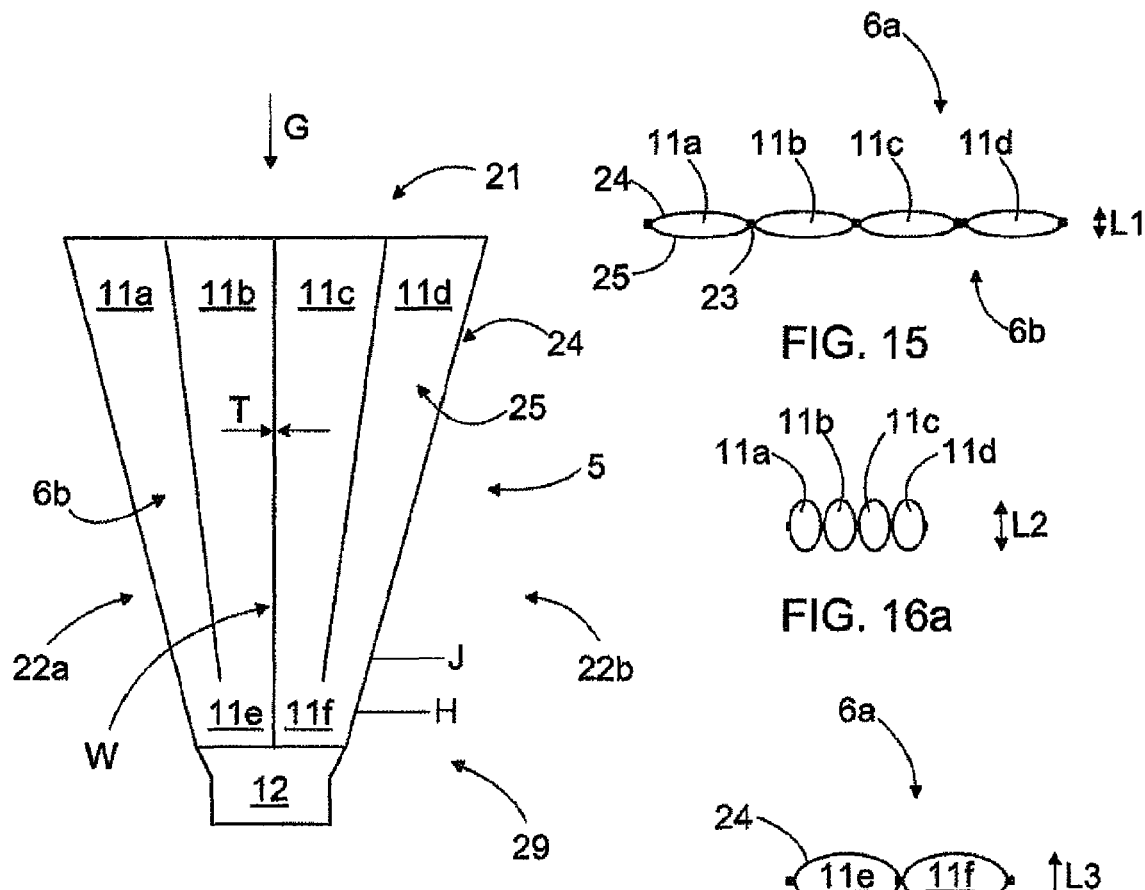
FIG. 14
FIG. 15
FIG. 16a
FIG. 16b
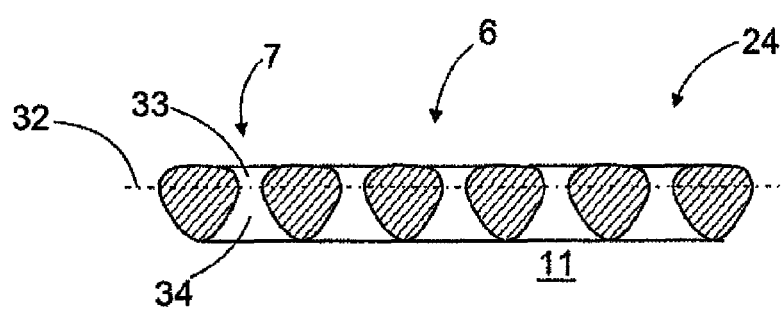
FIG. 17

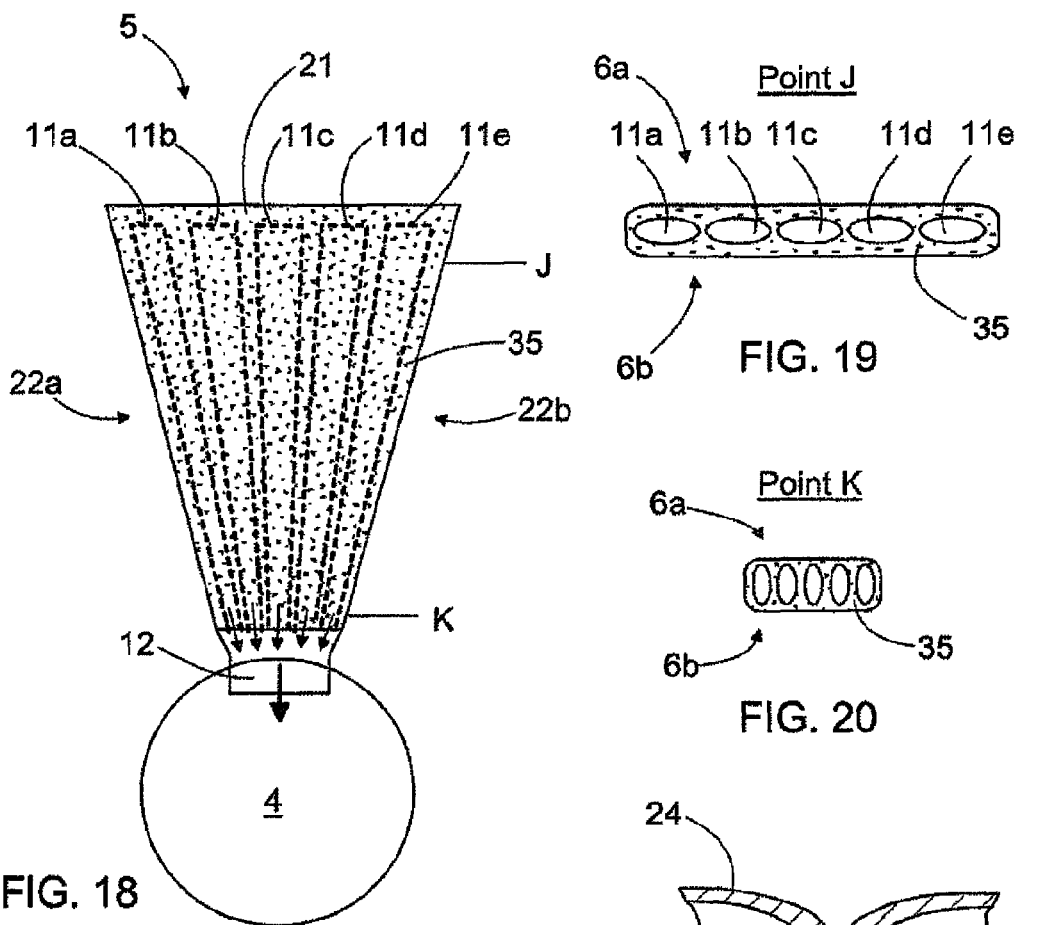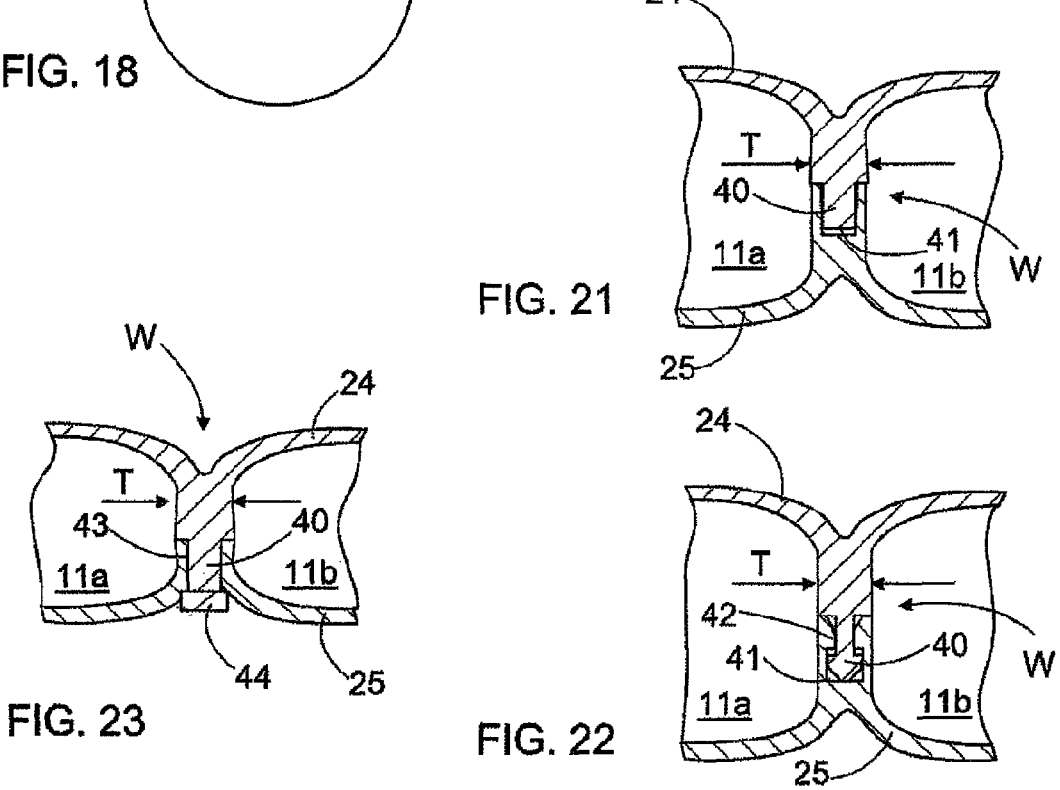

US 8,414,769 B2

DISC FILTER SECTOR AND DISC FILTER

BACKGROUND OF THE INVENTION

The invention relates to a disc filter and its sector. A disc filter has several essentially triangular sectors that form a relatively thin disc that is rotated in a basin containing a suspension to be filtered. The sector comprises opposing side surfaces with several openings through which liquid filtered from the suspension can enter a flow channel inside the sector and on through a neck section of the sector to the body of the disc filter. Solid matter stays against the outer surface of the sector, from which it is removed to a discharge shaft at the end of the filtering step. The object of the invention is described in more detail in the preambles of the independent claims.

For instance in mining industry, metal processing, chemical industry, and in the processes of foodstuff and pharmaceutical manufacturing, there is a need for solid-liquid filtering, in which liquid and solid particles are separated from a suspension of solid matter and liquid. Mechanical filtering devices of varying operating principles and properties have been developed for solid-liquid filtering, and in these a pressure difference is utilised in the separation of the liquid phase and solid matter phase. The disc filter is an example of solid-liquid filters of this type.

The disc filter comprises a tubular body with essentially triangular sector elements arranged on its outer circumference side by side to form a disc-like structure. Negative pressure is applied inside the sector elements, and the side surfaces of the sector elements act as filtering surfaces that are generally furnished with a filtering fabric. Said filtering surfaces have openings through which the liquid that passed through the filtering fabric enters the sector element to flow under the influence of the negative pressure on to the body of the disc filter. A problem with the present sector elements is that the flow from inside the sector element to the neck section and on to the body is not efficient enough, which weakens the filtering capacity of the filter.

BRIEF DESCRIPTION OF THE INVENTION

It is an object of the present invention to provide a novel and improved disc filter sector and disc filter.

The sector of the invention is characterised in that the sector comprises a first side element and a second side element that are made of plastic material; mating surfaces of the side elements are placed against each other during assembly; the sector comprises at least two essentially radial parallel flow channels; the first side element and the second side element form a separating wall between the parallel flow channels; and the separating wall extends continuously from the end of the sector to the neck section of the sector, whereby flows in the adjacent parallel flow channels are separated from each other.

The disc filter of the invention is characterised in that its sector comprises a first side element and a second side element that are made of plastic material; sector comprises at least two essentially radial parallel flow channels; the first side element and the second side element form a separating wall between the parallel flow channels; and the separating wall extends continuously from the end of the sector to the neck section of the sector, whereby flows in the adjacent parallel flow channels are separated from each other.

The idea of the invention is that the disc filter sector comprises two or more adjacent flow channels inside the sector element. The flow channels are connected to openings in the side surfaces of the sector and to the neck section. The flow channels are essentially radial so that the filtered liquid phase can flow inside the sector towards the neck section and on to the body of the disc filter. There is a separating wall between at least two adjacent flow channels to separate the channels from each other. The separating wall extends from an end portion of the sector to a neck portion of the sector. Furthermore the sector is formed of two side elements the mating surfaces of which are arranged against each other. The side elements are made of plastic material.

The invention provides the advantage that the flow of the filtered liquid inside the sector towards the neck section becomes more controlled when it occurs in two or more separate flow channels. A separating wall between the flow channels prevents the filtered liquid to flow inside the sector in the direction transverse to the radial direction, thus preventing problems that occur especially when the sector rises from a basin. Another advantage is that the walls between the flow channels act as radial reinforcements in the sector. The walls receive the compression load directed to the side surfaces of the sector and further reinforce the sector against bending forces and torsional load. Separate reinforcements are then not necessarily needed. Thus, there are no extra structures inside the flow channels to cause flow resistance. Therefore, the structure of the invention permits a smooth flow from the openings of the side surfaces to the neck section. An efficient flow of the liquid phase filtered inside the sector improves the filtering efficiency of the disc filter. Further, because the sector can quickly and thoroughly be emptied of liquid, the disc filter can produce a drier than before and good-quality solid matter that will not necessarily need any additional drying in later steps of the process.

The idea of an embodiment is that the cross-sectional profile of the flow channel is curved. The cross-section can be a circle, oval, ellipse, or flattened circle. The curved shape is a flow-technically advantageous shape. Thus, the flow resistance of the flow channel can be reduced by suitably sizing and shaping the cross-section of the flow channel. In addition, due to the curved flow channels, the cross-section of the sector has an arch-like structure that is strength-wise advantageous.

The idea of an embodiment is that the cross-sectional profile of the flow channel is different on the end side and on the neck section side.

The idea of an embodiment is that the cross-sectional profile of the flow channel changes steplessly between the end and neck section.

The idea of an embodiment is that the cross-sectional profile of the flow channel is oval on both the end side and the neck section side.

The idea of an embodiment is that the cross-sectional profile of the flow channel is oval on the end side in such a manner that its dimension towards the sides of the sector is bigger than towards the side surfaces. Further, the cross-sectional profile of the flow channel is oval on the neck section side in such a manner that its dimension towards the side surfaces is bigger than towards the sides of the sector.

The idea of an embodiment is that the cross-sectional area of the flow channel is bigger on the neck section side than on the end side. The cross-sectional area thus increases in the flow direction of the flow channel. Liquid enters the flow channel through the openings on the side surface along the entire length of the flow channel, whereby on the neck section, the flow rate is higher than on the end side.

The idea of an embodiment is that a connecting joint between the two side elements is located in the middle of the sector. Alternatively the structure may be unsymmetrical so that the connection joint may be located at a shorter distance from one side element. Still one possibility is that an inner surface of only one side element is provided with protrusions forming separating walls between the side elements.

The idea of an embodiment is that the sector narrows from the neck section towards the end when seen in the direction of rotation of the disc filter, i.e. from the side of the sector.

The idea of an embodiment is that the side surfaces of the sector are wavy. The wavy form increases the area of the side surface, whereby the filtering area can be larger. This naturally improves the efficiency of the sector. The wavy side surface can have several openings in differing directions. This way, the openings can be positioned not only at the highest point of the wave surface, but also on the sides of the waves, whereby the liquid to be filtered can efficiently enter the sector.

The idea of an embodiment is that the separating wall between parallel flow channels has a predetermined height transverse to the direction of the side surfaces, and that the height of the separating wall is arranged to increase towards the neck section. The sector may narrow from the neck section towards the end. Moreover the side surfaces of the sector may be wavy having wave crests and hollows. The separating wall has always a predetermined height so that flows in the separate flow channels are kept separated.

The idea of an embodiment is that the side surface of the sector has openings whose surface areas increase towards the flow channel. This facilitates the entry of the filtered liquid into the flow channel.

The idea of an embodiment is that the sector comprises two side elements having inner mating surfaces. The mating surfaces of the side elements comprise connection points at the separating walls. The connection points may be placed liquid-tightly against each other during assembly. The connection points may be provided with substantially planar sealing surface areas, which are arranged against each other. Alternatively the connection points are provided with tongue and groove joint members. Tongue and groove joint assures good sealing. The connection points may also be provided with shape-locking fastening elements, thus fastening and facilitating the assembly of the sector.

The idea of an embodiment is that the sector comprises at least one first side element and at least one second side element that are furnished with several openings. The inner surfaces of the side elements are wavy and have wave crests and hollows. Further, the side elements are fastened to each other so that the wave crests on the inner surfaces of the side elements come together, whereby the side elements form between them flow channels that are defined by the wave hollows and the separating partition walls formed by the wave crests. The outer surface of the side element forms the visible side surface of the sector.

The idea of an embodiment is that the sector is formed of side elements with wavy outer surfaces. The side surfaces of the sector are then wavy and the filtering area of the sector can be clearly larger than with a sector having a flat filtering surface.

The idea of an embodiment is that the sector is formed of side elements that are fastened to each other with fastening elements at partition walls formed by wave crests in such a manner that the fastening elements are outside the flow channels. This way the fastening elements do not cause flow resistance in the flow channel. In addition, if the fastening elements are arranged in the perpendicular direction of the sector, their installation is easy and quick.

The idea of an embodiment is that the sector is formed of side elements that are fastened to each other with shape-locking fastening elements at the separating wall. Due to the shape-locking, the assembly of the sector is fast and simple.

The idea of an embodiment is that the sector is made of one or more components that are at least mainly made of plastic material. The advantage of plastic is that it is light, strong, inexpensive, easily machinable, and endures chemical stress well. The plastic material can, if necessary, be reinforced with reinforcement fibres or the like. The components can be made by injection-moulding, moulding, rotation moulding, thermoforming or chip-removing machining. The flow openings can be made with cores, if necessary. Injection-moulding is well suited for mass-production, whereas rotation moulding permits the making of even small batches economically.

The idea of an embodiment is that replaceable filtering surfaces are arranged against the side surfaces of the sector. The filtering surface can be made of solid-liquid filtering fabric or the like, whereby the liquid in the suspension being filtered penetrates the fabric and flows on through openings in the side surfaces inside the sector. The solid matter in the suspension being filtered stays against the outer surface of the fabric during filtration. A bag made of solid-liquid filtering fabric can be arranged on the sector and tightened against the side surfaces of the sector. The filtering bag can comprise heat-shrinking threads, in which case the bag can be tightened in place with heat.

The idea of an embodiment is that the openings in the side surfaces of the sector are dimensioned according to the suspension being filtered so that the side surfaces of the sector are arranged to act as filtering surfaces as such. The liquid in the suspension can pass through the openings in the side surface, whereas the solid matter in the suspension stays against the side surface. This application does not require a separate filtering surface.

The idea of an embodiment is that the sector and disc filter are designed and dimensioned for use in the mining industry. The shape and size of the sector and the size of the flow channels and the size of the openings in the side surfaces are dimensioned so that the sector is suitable for filtering suspensions used in the mining industry.

BRIEF DESCRIPTION OF THE FIGURES

Some embodiments are described in more detail in the attached drawings, in which FIG. 4 is a schematic sectional view of a sector with side surfaces made of several pipes, FIG. 5 is a schematic side view of a pipe from which the sector side surfaces can be formed, FIG. 6 is schematic end view, i.e. a view from direction C, of the pipe of FIG. 5, FIG. 7a is a schematic view of the pipe of FIG. 5 as seen from the direction of the neck, i.e. direction D, FIG. 7b is a schematic view of an alternative pipe cross-profile as seen from the direction of the neck, i.e. direction D, FIG. 8 is a schematic view of the cross-profile of a sector made of pipes, FIG. 9 is a schematic view of the cross-profile of a second sector made of pipes, FIG. 10 is a schematic cross-sectional view of a sector with side surfaces made of several pipes fastened to each other and with a filtering bag or the like arranged around it, FIG. 11 is a schematic perspective view of two side elements that are arranged together in direction E during the assembly of the sector, FIG. 12 is a schematic view cross-cut at point F of the structure of a sector assembled from side elements, FIG. 13 is a schematic cross-sectional view of a second sector assembled from side elements and with a filtering bag arranged on it, FIG. 14 is a schematic side view of a sector in which adjacent flow channels join together already before the neck section, FIG. 15 is a schematic view from direction G of the sector of FIG. 14 without an end piece, FIG. 16a is a schematic view cross-cut at point J of the sector of FIG. 14, FIG. 16b is a schematic view cross-cut at point H of the sector of FIG. 14, FIG. 17 is a schematic cross-sectional view of a sector side surface furnished with openings that expand towards the flow channel and outer surface, FIG. 18 is a schematic side view of a sector made of porous filtering material, FIG. 19 is a schematic view cross-cut at point J of the cross-section of the sector of FIG. 18, FIG. 20 is a schematic view cross-cut at point K of the cross-section of the sector of FIG. 18, and FIGS. 21 to 23 are schematic cross-sectional views of details of the connecting points of some side elements.

In the figures, some embodiments of the invention are shown simplified for the sake of clarity. Similar parts are marked with the same reference numbers in the figures.

DETAILED DESCRIPTION OF SOME EMBODIMENTS OF THE INVENTION

Figure 1:
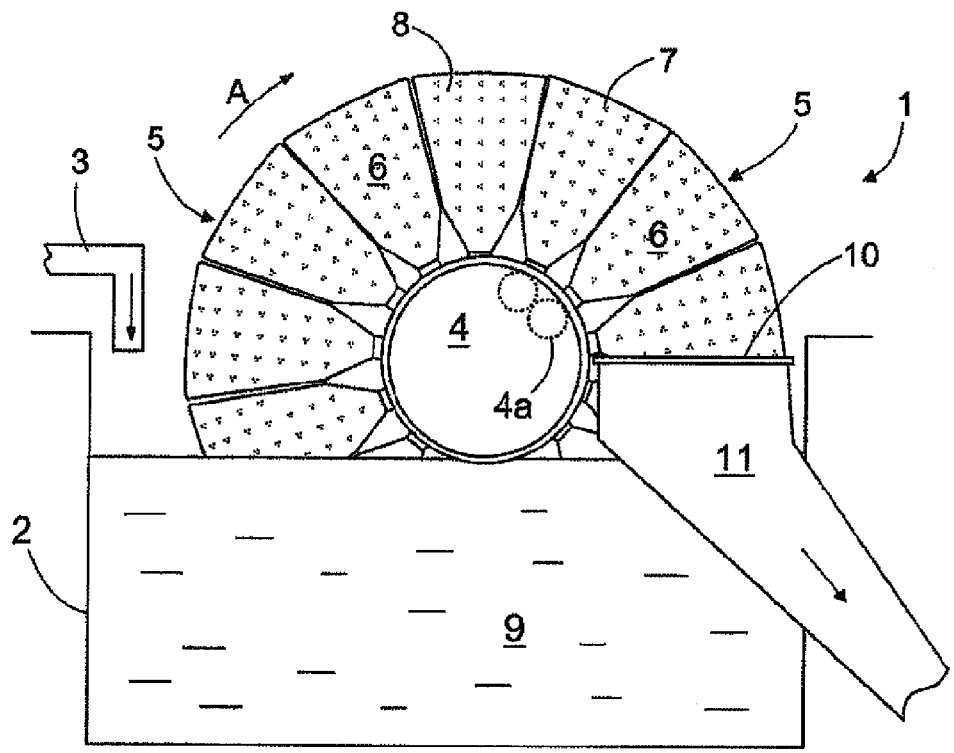
FIG. 1 is a schematic side view of a disc filter.

FIG. 1 shows a disc filter 1 that comprises a basin 2 to which a solution formed by solid matter and liquid is led from a supply channel 3. It should be noted that the level of the solution in the basin 2 is typically lower than in the case shown in FIG. 1. Further, the disc filter 1 comprises a body 4 rotatable around a horizontal axis. The body 4 can be made of one tubular piece or alternatively of several pipes 4a. On the outer circumference of the body 4, several essentially triangular sectors 5 are placed side by side so that the sectors 5 form a relatively narrow disc-like structure around the body 4. One body 4 can comprise several disc-like structures of this type arranged at a desired distance from each other in the axial direction. The triangular side surfaces 6 of each sector 5 have openings 7. A filter fabric 8 or the like can be arranged against the side surface to act as a filtering layer. The body 4 of the disc filter is rotated around its longitudinal axis in direction A, whereby each sector 5 at a time dips into the solution 9 in the basin 2. Inside the sector 5 dipped into the solution 9 negative pressure can be applied through the body 4. Liquid can then flow through the filtering bag 8 shown in FIGS. 2 and 3 and made of a solid-liquid filtering fabric and on through the openings 7 on the side surface 6 of the sector 5 inside the sector element 5. Inside the sector 5, the liquid flows under the influence of the negative pressure along a flow channel 11 to a neck section 12 of the sector and on through the body 4 out of the disc filter 1. The solid matter in turn stays on the surface of the filtering fabric 8 from which it can be removed with doctoring blades 10 or pressure medium jets to a discharge shaft 13 before the next filtering cycle. Alternatively, the fabric is blown with pressure to remove the solid matter cake, in which case the method is called snap-blow.

Figures 2, 3:
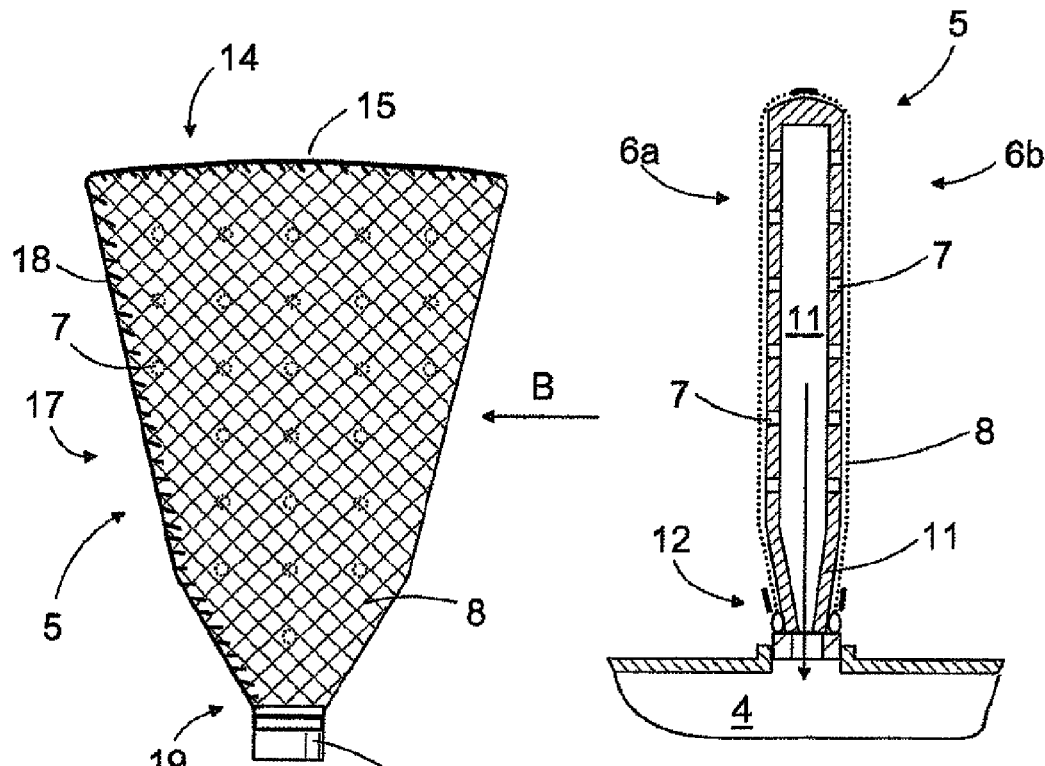
FIG. 2 is a schematic side view of a sector of a disc filter.
FIG. 3 is a schematic sectional view of a sector and its connection with the body of a disc filter.

As shown in FIGS. 2 and 3, it is possible to arrange a filtering bag 8 on the sector 5. The wide end of the filtering bag 8 can have an installation opening 14 with closing elements 15, such as a zipper. Instead of the end, the installation opening 17 and closing elements 18 can be located at the side of the sector 5. As FIG. 3 shows, the neck section 12 of the sector 5 is connected to the body 4. The narrow end of the filtering bag 8 has a neck opening 19 sealed against the outer surface of the neck section 12 of the sector. When the filtering bag 8 is arranged in place, it can form a uniform structure around the sector 5. Alternatively, replaceable filtering elements made of solid-liquid filtering fabric can be arranged only against the side surfaces of the sector and fastened in a suitable manner to the sector 5.

The sector 5 of FIG. 4 comprises a neck section 12, side surfaces 6 made of several pipes 20, and an end piece 21. The neck section 12 and end piece 21 can be fixed parts of the sector 5 or they can be replaceable pieces like the pipes 20. At the narrow end of the sector 5 the bottom ends of the pipes 20 are connected to the neck section 12 and at the wide end of the sector, the top ends of the pipes 20 are connected to the end piece 21. Alternatively, the top end of each pipe 20 can be blocked at the wide end of the sector to form together the end of the sector. The sector 5 of the figure has seven pipes, but the number of the pipes can also be determined otherwise taking into account the angle of the sector, dimensions of each pipe, and flow issues. The number of the pipes is preferably 3 to 8. The outermost pipes 20 of the sector 5 form the sides 22a and 22b of the sector. The pipes 20 have openings 7 at least on the surfaces facing the side surfaces 6a, 6b. FIG. 5 illustrates different openings 7a to 7e that can be applied to both the sector made of pipes and in the constructions shown later in FIGS. 11 to 18. It is thus possible to use slit-like openings 7a, a line of small consecutive openings 7b, round openings 7c, oval openings 7d, angular openings 7e or combinations thereof in the sector 5.

As shown in FIG. 5, the top end of the pipe 20 can be wider than the bottom end as seen from the side. FIG. 6 shows that the top end of the pipe 20 is oval and has a bigger dimension in the direction of the sector sides 22a, 22b than in the direction of the side surfaces 6a, 6b. At the bottom end of the pipe 20 the situation may be reversed, as can be seen in FIG. 7a. Due to the design of the pipe 20, the sector 5 obtains a triangular shape. In the middle of the pipe 20, the cross-sectional profile can be round or oval. FIG. 7b shows an alternative in which the shape of the cross-sectional profile of the bottom end of the pipe 20 corresponds essentially to the shape of the top end of the pipe 20. At the neck section 12 end, the cross-sectional area A2 of the pipe can be smaller than, equal to, or larger than the area A1 at the end 21. In the solution of FIG. 7b, the neck section side area A2 can be smaller than the area A1 of the end side.

The sector 5 can be made by cutting pipes having suitable lengths and a predefined diameter and a predefined number of openings of different sizes and shapes. After this, the pipe 20 can be pressed to obtain the shapes shown in FIGS. 4 to 7b. Next, the shaped pipes 20 are arranged side by side and fastened to each other by gluing, welding, or with mechanical fastening elements, for instance.

It is further possible that the pipes are first fastened to each other and then the top and bottom ends of the formed preform are pressed to form the sector 5 shown in FIG. 4. The pipes 20 can be made of a plastic material, and they can be heated to facilitate the formation.

Yet another possibility is to make in advance pipes 20 with desired dimensions, cross-sectional profiles, and openings. The sector 5 can be assembled by fastening the outer surfaces of the pipes 20 to each other.

In the cross-section of the pipes 20, the profile of the flow channel is preferably curved, i.e. the cross-section is a circle, oval, flattened circle or the like. Naturally, it is also possible to make a sector in which the cross-sectional profile of the flow channel 11 is a rectangle, rounded rectangle, square, or triangle.

The pipes 20 can also be fastened to each other with fastening blocks 23 arranged between the pipes, as shown in FIG. 9. In some cases, the pipes 20 are not fastened to each other at the sides, but connected into an entity only by means of the end piece 21 and neck section 12.

FIGS. 8, 9, and 10 show in a highly simplified manner different applications of the wide end of the sector 5 made of pipes 20. The curved outer surfaces of the pipes 20 can form the side surfaces 6a and 6b of the sector 5, in which case they have a wavy surface. If a filtering bag 8 or a corresponding flexible filtering surface is arranged on the sector 5, it settles against the wavy side surfaces 6a, 6b and also obtains a wavy form.

FIG. 11 shows an alternative solution for making a sector comprising several flow channels 11. The sector 5 can be formed by arranging the inner surfaces 24a and 25a of the first side element 24 and second side element 25 against each other. At least the inner surfaces 24a, 25a of the side elements are wavy and comprise wave crests 26 and hollows 27. When mating surfaces of the side elements 24 and 25 are arranged against each other, the wave crests 26 settle against each other, whereby several parallel flow channels 11 form between the crests. The flow channels 11 are thus defined by the walls formed by the wave crests 26 and the wave hollows 27.

The side elements 24 and 25 can be made for instance by moulding from a suitable plastic material. The side elements 24, 25 have a wide end 28 and a narrow end 29 so that the assembled sector 5 is essentially triangular. For the sake of clarity, FIG. 11 only shows some of the openings 7. Further, FIG. 11 does not show the neck section 12 or end 21 that can be like those shown in FIG. 4, for example. The end 21 can also be integrated to the side elements 24, 25.

FIG. 12 shows a cross-section at point F. The outer surfaces of the side elements 24, 25 can also be wavy, which means that the side surfaces 6a, 6b of the sector 5 are wavy. The openings in the side elements 24, 25 can be sized in such a manner that the side surfaces 6a, 6b of the sector 5 act as filtering surfaces without any separate filtering element. Alternatively, a replaceable filtering element, such as a filtering bag, is arranged on the sector.

FIG. 12 further shows that the side elements 24, 25 can be fastened to each other at the wave crests 26 with fastening elements 30, such as screws, studs or the like. The fastening elements 30 can be positioned from the side surface 6a, 6b side of the sector 5 so as not to reside in the flow channel 11 or affect in any way the flow in the flow channel 11.

FIG. 13 shows an alternative cross-section of the sector. Differing from FIG. 12, the side elements 24, 25 are fastened to each other at the wave crests 26 with glue or by welding without any separate fastening elements. The mating surfaces of the side elements are provided with substantially planar connecting points 31. Further, the waveform of the inner surface of the side elements 24, 25 differs from FIG. 12. In FIG. 13, the waveform of the inner surfaces is selected to provide the flow channels 11 with a rectangular profile rounded at the corners. It should be noted that the waveform of the inner surfaces can be selected as desired and can comprise parts of curves, straight lines, or combinations thereof. As FIGS. 12 and 13 show, the cross-section of the sector is an arch-like structure that is preferable for strength.

In FIG. 13, the outer surfaces 24b, 25b of the side elements 24, 25 are essentially planar, but they can also have a wavy form, if necessary. The waviness of the inner surfaces 24a, 25a can be similar to or different than the waviness of the outer surfaces 24b, 25b.

As FIG. 13 shows, the openings 7 in the side elements 24, 25 can expand towards the flow channel 11, which assists the flow of the filtered liquid into the flow channel 11.

FIG. 14 shows a sector 5 formed of side elements 24, 25, which comprises four parallel flow channels 11a to 11d. At the narrow end 29 of the sector 5, the adjacent flow channels 11a and 11b and flow channels 11c and 11d join together before the neck section 12 and form two flow channels 11e and 11f. This embodiment can naturally be applied to situations where the sector 5 comprises even more flow channels 11. Further, three or more flow channels can be arranged to join together in the sector before the neck section. It is also possible that the sector comprises two or more points where two or more flow channels join together. These connection points can be equidistant or at different distances from the neck section. With this embodiment, the bottom end of the sector at the neck side can be conveniently narrowed. However, there is always at least one separating wall W, which reaches continuously from the end section 21 to the neck section 12 of the sector. The separating wall W may be a blind wall i.e. a wall without openings through it. Thus, the separating wall may be liquid-tight. Alternatively the wall W may be substantially liquid-tight. However, the separating wall W is designed so that it is capable of keeping the flows of the adjacent flow channels separate from each other. As shown in FIGS. 12-14 the separating wall W has a width T when seen in the longitudinal direction of the wall W. The width T of the wall W may be constant along the length of the wall W, or at least the wall does not include any abrupt protruding portions. Smooth surface of the separating wall W ensures smooth flow in the flow channels. Furthermore, the separating wall W or any other wall that reaches to the end of the sector may have a width increasing towards the end of the sector. The width of the wall may increase towards the end of the sector in linear or progressive manner. By increasing the wall width it is possible to make the outer edge portion of the sector more rigid, which is advantageous especially in sectors narrowing towards the end of the sector when seen in the direction of rotation. And still, the surfaces of the separating wall may be smooth.

FIGS. 15, 16a, and 16b show that the cross-section of the flow channels 11 can be oval on the end side, before joining together, and on the joined section. At the end and on the joined section, the oval shape can have a bigger dimension in the direction of the sides than in the direction of the side surfaces, but before the joined section at point J, the situation can be reversed. The figures further show that the thickness L3 of the sector can be bigger on the joined section than at the end L1. At point J before the joining, the thickness L2 can also be bigger than at the end. The thickness L3 can be bigger than or the same as the thickness L2. The sector can narrow towards the end as seen from the side.

It should be noted that the total cross-sectional area of the flow channels on the sector end side can for constructional reasons be larger than the total cross-sectional area on the neck section side. If the construction allows it, the total cross-sectional area of the flow channels can be larger on the neck section side than on the end side or the area can be nearly equal, which is preferable for the flow. The dimensioning of the wall thicknesses of the flow channels can affect the sector thickness on the neck section side and end side.

FIG. 17 shows the cross-section of a part of the side element 24 and illustrates a possible design of the openings 7. The shape of the openings 7 can be such that it opens simultaneously towards the side surface 6 and flow channel 11. This type of side piece 24 can be made by injection-moulding, rotation moulding or moulding it in a conventional manner in a mould so that the parting surface 32 is between the section 33 opening to the side surface 6 and the section 34 opening to the flow channel 11.

FIG. 18 shows a sector 5 that is made of filtering material 35, such as granular ceramics sintered into a uniform piece at high temperature and compression. This type of ceramic sector is porous. The pores between the granules or corresponding particles act as openings through which liquid in the suspension being filtered can pass. However, the granules are selected in such a manner that the formed pores are so small that the solid matter in the suspension being filtered cannot penetrate the filtering material 35. Other porous filtering materials suitable for solid-liquid filtering can also be used as sector material. Two or more essentially radial flow channels 11a to 11e can be formed inside the sector 5. Some possible cross-sectional profiles of the flow channels 11 are shown in FIGS. 19 and 20. The profiles and other characteristics of the flow channels 11 can also be selected in some other manner described in this application.

FIGS. 21, 22, and 23 show details of ways to join the sector side elements 24, 25 together. In FIG. 21, the first side element 24 comprises in its wall section a bracket 40 that is arranged in a space 41 in the wall section of the second side element 25. Also other tongue and grove type joints can be applied. The bracket 40 and space 41 can be dimensioned to lock into each other. Alternatively the bracket 40 and space 41 can shape-lock, as shown in FIG. 22. In such a case, there may be one or more retaining elements 42 between the bracket 40 and space 41. One alternative is that the end of the bracket 40 has an enlargement, such as a spherical or triangular section, and that the space 41 has an easily deformable portion. Further, FIG. 23 shows a locking solution in which the second side element 25 comprises an opening 43 through which the bracket 40 extends to the outer surface side of the second side element 25. The outermost end of the bracket 40 can be modified after it is fastened by flattening its end 44, for instance, so that the bracket 40 can no longer push through the opening 43. The end 44 can be modified by heating, compression, or bending, for instance. It is also possible that only the wall section of the first side element 24 forms the wall between the flow channels 11a, 11b, in which case the second side element 25 only has openings 41 to receive the bracket 40. The joining solutions shown in FIGS. 21 to 23 facilitate and speed up the assembly of the sector from components.

The separating wall W has a predetermined height h1 transverse to the direction of the side surfaces 6a, 6b. The height h1 is shown for example in FIG. 12. The height h1 of the separating wall W is arranged to increase towards the neck section 12 of the sector. The height h1 of the separating wall W may be for example 4 mm at the end 21 of the sector and 30 mm at the neck section 12 of the sector.

In some cases the features described in this application can be used as such regardless of other features. On the other hand, the features described in this application can also be combined as necessary to form various combinations.

The drawings and the related description is only intended to illustrate the idea of the invention. The invention may vary in detail within the scope of the claims.

The invention claimed is:

1. A disc filter sector comprising:
opposing side surfaces that are essentially triangular in shape and comprise a wide outer edge and a narrow inner edge,
sides that connect the side surfaces in a radial direction of the sector,
an end on the outer edge of the sector,
a neck section on the inner edge of the sector, the neck section being connectable to a body of the disc filter,
several openings in both side surfaces,
at least one essentially radial flow channel inside the sector, the flow channel being connected to the openings in the side surfaces and to the neck section, whereby filtered liquid is arranged to pass through the openings in the side surfaces to the flow channel and on through the neck section to the body of the disc filter,
wherein the sector comprises a first side element and a second side element that are made of plastic material,
mating surfaces of the side elements are placed against each other during assembly,
the sector comprises at least two essentially radial parallel flow channels,
the first side element and the second side element form a separating wall between the parallel flow channels,
the mating surfaces of the side elements comprise connection points at the separating wall provided with tongue and groove joint members extending in a direction perpendicular to the opposing side surfaces, and
the separating wall extends continuously from the end of the sector to the neck section of the sector, whereby flows in the adjacent parallel flow channels are prevented from mixing with each other.

* * * * *